Sept. 19, 1961 C. O. POLAND 3,000,296
BALER
Filed Aug. 10, 1959 2 Sheets-Sheet 1

INVENTOR.
CHARLES O. POLAND
BY
Harold B. Hood
ATTORNEY

Sept. 19, 1961   C. O. POLAND   3,000,296
BALER
Filed Aug. 10, 1959   2 Sheets-Sheet 2

INVENTOR.
CHARLES O. POLAND
BY Harold B. Hood
ATTORNEY

United States Patent Office 3,000,296
Patented Sept. 19, 1961

3,000,296
BALER
Charles O. Poland, Indianapolis, Ind., assignor to Indiana Farm Bureau Cooperative Association, Inc., Indianapolis, Ind., a corporation of Indiana
Filed Aug. 10, 1959, Ser. No. 832,723
5 Claims. (Cl. 100—251)

The present invention relates to baler mechanism and to an improvement for facilitating the baling of loose, compressible material within a bag or similar container, the bale to be tied off by strands applied to the exterior of the bag.

The mechanism has been designed primarily for the baling of wool as to which it has been found that serious disadvantages arise when the material is compressed and then tied by strands directly engaging the compressed material. Numerous expedients have theretofore been tried for compressing and packaging comparable material, but those expedients, so far as I am advised, have involved difficulties of manipulation which are overcome by the present invention.

According to the present invention, the material is compacted and compressed within a movable sleeve which is constructed and arranged to be contained within a bag or the like during the compaction of the material, which is so associated with the other parts of the baling machine as to permit the enwrapped bale to be tied while still restrained within the sleeve, and which may be subsequently withdrawn from the container to leave the compacted, enwrapped and tied bale free for removal from the machine.

Thus, the primary object of the invention is to provide improved means for forming a bale of compressible material within an enwrapment or container, while restraining such material against the exertion of distorting pressure upon the enwrapment, such means being so constructed and arranged as to permit withdrawal of the restraining means from the finished, tied bale.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
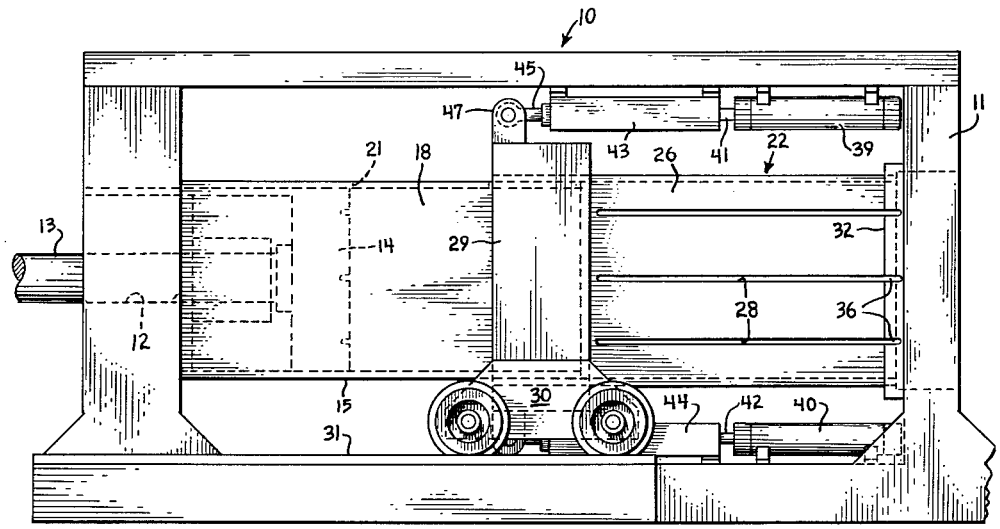
FIG. 1 is a side elevation of mechanism constructed in accordance with the present invention, the view being somewhat diagrammatic in the elimination of frame elements which may be required in commercial applications of the invention but which are inessential to the invention itself.

Referring more particularly to the drawings, it will be seen that I have illustrated a main frame which is indicated generally by the reference numeral 10 and which includes an end wall 11 which may be fixed or which, in some circumstances, may constitute a door swingable about a vertical axis and provided with latch means for holding it normally in closed position. The frame is formed to provide a guideway 12 for a plunger 13, the axis of said guideway, and consequently the axis of reciprocation of the plunger 13, being substantially perpendicular to the adjacent surface of the end wall 11. The plunger 13 preferably includes an enlarged head 14.

Fixedly mounted within the frame, and coaxial with the guideway 12, is a further guideway indicated generally by the reference numeral 15 and comprising a bottom wall 16, side walls 17 and 18 and a top wall 19 cooperating to define a charging chamber 20. In the illustrated embodiment of the invention, the top and bottom walls 19 and 16 are horizontal and the side walls 17 and 18 are vertical so that the chamber 20 is substantially rectangular in cross section; but it will be appreciated that the cross sectional shape of said chamber is not important to the invention. Preferably, the head 14 of the plunger 13 has a snug sliding fit in the chamber 20 and is reciprocable in a path which extends oppositely beyond a charging mouth 21, which, in the illustrated embodiment of the invention, is formed in the top wall 19 of the guideway 15. It will be understood, however, that the charging mouth 21 may be disposed anywhere in the perimeter of the guideway 15.

In accordance with conventional practice, power means (not shown) will be provided for driving the plunger 13 in its reciprocatory path.

A sleeve, indicated generally by the reference numeral 22, is telescopically associated with the guideway 15 and, in the illustrated embodiment of the invention, comprises solid top and bottom walls 23 and 24 and opposite side walls 25 and 26. The side wall 25 is formed with a plurality of slots 27 opening through that end of the wall 25 which faces the frame wall 11; and the wall 26 is formed with a like number of slots 28 which, respectively, substantially register with the slots 27 and open through the same end of the wall 26. For conventience, that end of the sleeve 22 which is adjacent the wall 11 will be referred to as the forward end of the sleeve.

At its rearward end, the sleeve 22 is surrounded by a collar 29 which is fixed to said sleeve and which may preferably be supported upon a pair of wheeled trucks 30, 30 which may be guidingly supported upon trackways 31, 31 provided by the frame 10.

Preferably, a perimetral frame 32 projects from the inner face of the wall 11 and is so constructed and arranged as snugly to receive the forward ends of the walls of the sleeve 22 when said sleeve is in its forwardmost position, whereby said free wall ends are restrained against outward movement under the expanding pressure of the material being compacted during the operation of the baler. The inner face 34 of the wall 11 is formed with a plurality of transverse grooves 35 which register with the ends of the slots 27 and 28, and the side walls of the frame 32 are formed with notches 36 registering with the grooves 35, all for a purpose to appear hereinafter. Similarly, the forward face 37 of the plunger head 14 is formed with a plurality of transverse grooves 38 which likewise register with the slots 27 and 28.

Figure 2:
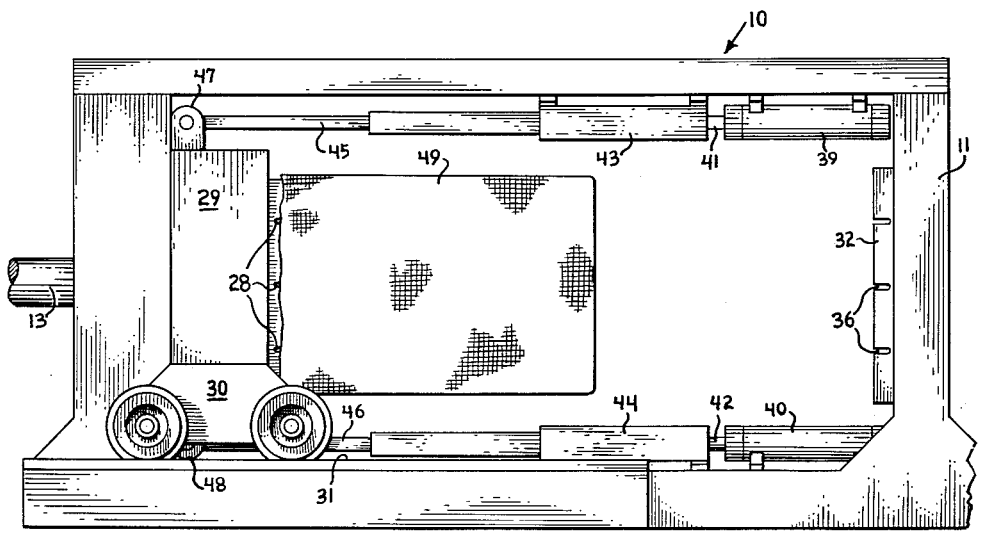
FIG. 2 is a similar view showing the parts in a different condition of adjustment.
Figure 3:
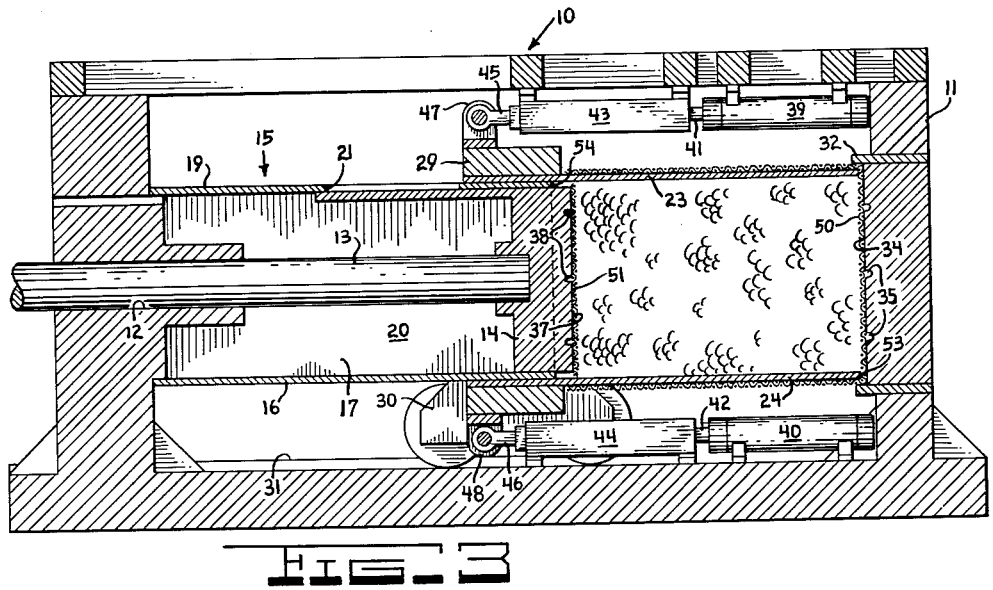
FIG. 3 is a longitudinal section through the mechanism of FIG. 1 illustrating the condition in which a bale has been completed but before it has been tied.
Figure 4:
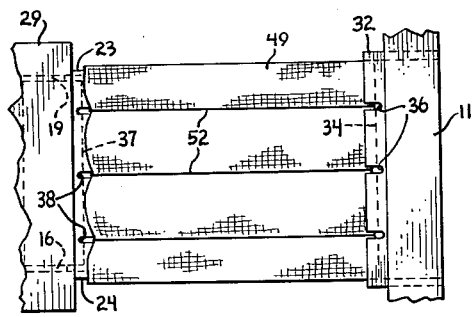
FIG. 4 is a fragmental elevation showing the completed bale after it has been tied but before withdrawal of the restraining sleeve.
Figure 5:
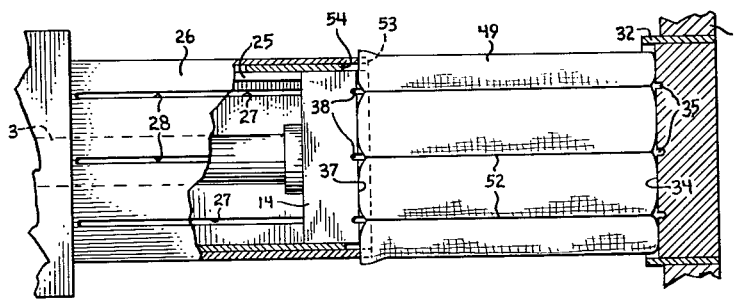
FIG. 5 is a similar, fragmental elevation showing the conditions of the parts just before completion of such withdrawal.

Power means is provided for moving the sleeve 22 between its position illustrated in FIGS. 1 and 3 and its position illustrated in FIG. 2. In the illustrated embodiment of the invention, such power means comprises fluid motors 39 and 40 secured, respectively, to upper and lower elements of the frame 10 and including piston rods 41 and 42. The piston rod 41 is operatively connected to the input element of a motion-multiplying unit 43 and the piston rod 42 is operatively connected to the input element of a similar motion-multiplying unit 44. The output elements 45 and 46 of the units 43 and 44, respectively, are operatively connected to projecting ears 47 and 48 fixed to the collar 29.

Any conventional form of motion-multiplying unit may be used; and one acceptable form thereof is illustrated in detail in FIGS. 6 and 12 of the patent to J. L. Carroll, No. 2,857,060, issued October 21, 1958. The insertion of such a unit in the drive train between the motors 39 and 40 and the collar 29 is desirable in order to minimize the length of stroke of the fluid motor pistons, since the sleeve 22 must move through a distance slightly exceeding the length of a finished bale.

In the operation of the disclosed embodiment of the present invention, the motors 39 and 40 will be actuated to shift the sleeve 22 substantially to the position of FIG. 2, in which the forward end of the sleeve is free and unobstructed. Now, a suitable enwrapment, such as the burlap bag 49, closed at one end, is slipped over the sleeve 22 in such fashion that the bottom wall 50 of the bag engages the free end 53 of the sleeve 22. The bag is so proportioned and designed that, when it is pulled tightly into this position, its open mouth will lie slightly forward with respect to the rearward ends of the slots 27 and 28. It will be noted that the length of said slots is such that their rearward ends are disposed closely adjacent, but forwardly with respect to, the forward end 54 of the guideway 15 when the sleeve 22 is in its forwardmost position.

With the bag in position on the sleeve 22, the motors 39 and 40 are actuated to shift the sleeve 22 forwardly until the bottom 50 of the bag 49 is pressed against the face 34 of the wall 11, the frame 32 surrounding and reinforcing the forward ends of the walls 23, 24, 25 and 26 of the sleeve 22.

Now, the power means for reciprocating the plunger 13 is set onto operation while the material to be baled is fed, by any well known means, through the charging mouth 21. Upon each stroke of the plunger, of course, a quantity of the material to be baled will be forced from the charging chamber 20 into the region encompassed by the bag 49. The interior construction of the sleeve 22 and the mode of operation of the baler per se will, of course, conform to well established practice in the baling art.

After a suitable amount of material has been compacted, a closure piece 51, which may be a suitably-shaped sheet of the same material from which the bag 49 is made, is dropped through the charging mouth 21 ahead of the advancing plunger 13 and is carried, by said plunger into the position in which it is illustrated in FIG. 3. At this time, operation of the plunger is stopped, with the plunger in its fully advanced position to hold the closure piece 51 in place and to retain the compaction of the baled material.

Now, wires or other tying strands 52 are passed through the notches 36 and grooves 35 and through the grooves 38 to surround the finished bale outside the bag 49 and the closure piece 51, and said strands are tied to secure the enwrapped bale. Thereupon, with the plunger 13 still in its advanced position, the motors 39 and 40 are actuated to retract the sleeve 22. Since the bale is held against movement with the sleeve, by the advanced plunger 13, the sleeve will thus be withdrawn from within the bag 49. When the sleeve 22 reaches its fully retracted position, in which its forward end 53 is coplanar with or behind the forward end of the guideway 15, the plunger 13 may be retracted, whereupon the bale may be removed laterally from the frame 10 or, if the wall 11 comprises a hinged door, that door may be opened to permit removal of the bale axially from the frame.

I claim as my invention:

1. A baler comprising a main frame providing an end wall, a plunger guided in said frame for reciprocation toward and away from said end wall, and a hollow sleeve coaxial with said plunger, open at both ends and guided in said frame for axial movement relative thereto, opposite wall portions of said sleeve being formed with substantially-registering, axially-extending slots opening through the forward ends of said wall portions, said sleeve being movable between a position in which its forward end substantially abuts said frame end wall and a position in which its forward end is retracted from said frame end wall by a distance at least substantially equal to the axial length of said slots.

2. The baler of claim 1 including a pair of fluid motors acting, at substantially diametrically opposite points, on said sleeve to move the same between its two extreme positions, each fluid motor comprising a cylinder element and a piston element, one of said elements being fixed relative to said frame and the other of said elements being operatively connected, through a motion-multiplying unit, with said sleeve.

3. The baler of claim 1 in which said frame end wall and the forward face of said plunger are each formed with a plurality of transverse, tie-receiving grooves registering, respectively, with said sleeve wall slots, the grooves in said end wall registering with the open, forward ends of said slots.

4. A baler comprising a main frame providing an end wall, means in said frame defining a charging chamber having a bottom and side walls and arranged on an axis substantially perpendicular to said end wall, said charging chamber having a charge-receiving mouth, a plunger mounted for axial reciprocation in said charging chamber and movable oppositely past said mouth, a hollow sleeve, open at both ends and reciprocably sleeved on said charging chamber walls, said sleeve having top and bottom walls and having side walls, the side walls of said sleeve each being formed with a plurality of axially-extending slots opening through the forward ends of said sleeve walls and terminating short of the rearward ends of said sleeve walls, said frame end wall being formed with transverse grooves registering with the open ends of said sleeve wall slots, said frame, said chamber-defining means and said sleeve being so proportioned and arranged that, when the forward end of said sleeve is substantially in abutment with said frame end wall, the rearward ends of said slots are closely adjacent, but forwardly spaced from, the forward end of said chamber-defining means, and said sleeve being retractable to a position in which its forward end substantially coincides with the forward end of said chamber-defining means.

5. The baler of claim 4 including trackway means extending longitudinally of said frame and guidingly supporting said sleeve for reciprocation, and power means mounted on said frame and operatively engaging said sleeve to shift the same between its extreme positions.

References Cited in the file of this patent

UNITED STATES PATENTS

| 769,597 | Elam | Sept. 9, 1904 |
| 1,372,898 | Nelson | Mar. 29, 1921 |

FOREIGN PATENTS

| 148,097 | Germany | January 1904 |
| 567,672 | Great Britain | Feb. 26, 1945 |